United States Patent [19]
Froome

[11] Patent Number: 4,616,625
[45] Date of Patent: Oct. 14, 1986

[54] PORTABLE BACKYARD CRAB COOKER OR STEAMER

[76] Inventor: Beresford E. Froome, 1401 Ritchie Rd., Capitol Heights, Md. 20743

[21] Appl. No.: 704,050

[22] Filed: Aug. 21, 1985

[51] Int. Cl.$^4$ ............................ F24C 1/16; A47J 37/12
[52] U.S. Cl. .................................... 126/25 R; 99/410; 126/9 R; 126/38; 126/369; 126/377
[58] Field of Search ............... 126/5, 9 R, 20, 25 R, 126/33, 41 R, 369, 377, 38, 44; 99/410, 411, 415

[56] References Cited

U.S. PATENT DOCUMENTS

| | | | |
|---|---|---|---|
| 136,588 | 3/1873 | Collins | 126/369 |
| 1,233,922 | 7/1917 | Schmidt | 126/33 |
| 3,722,498 | 3/1973 | Kimbrough | 126/38 |
| 4,062,341 | 12/1977 | Panzarella | 126/41 R |
| 4,105,013 | 8/1978 | Vache | 126/38 |
| 4,495,860 | 1/1985 | Hitch et al. | 126/9 R X |

FOREIGN PATENT DOCUMENTS 19048 of 1904 United Kingdom ................ 126/377

*Primary Examiner*—Margaret A. Focarino
*Attorney, Agent, or Firm*—William F. Frank

[57] ABSTRACT

The present invention comprises an easily moved about cooking unit having a heating assembly and a removable steamer assembly which is fitted to the top of the heating assembly. The heating assembly is provided with a replaceable tank of propane or other liquified gas and suitable heat controls. The steamer assembly comprises a steam producing pot with cover and a removable inner steaming pot to hold the shellfish out of the water while subjecting the shellfish to the steam.

5 Claims, 7 Drawing Figures

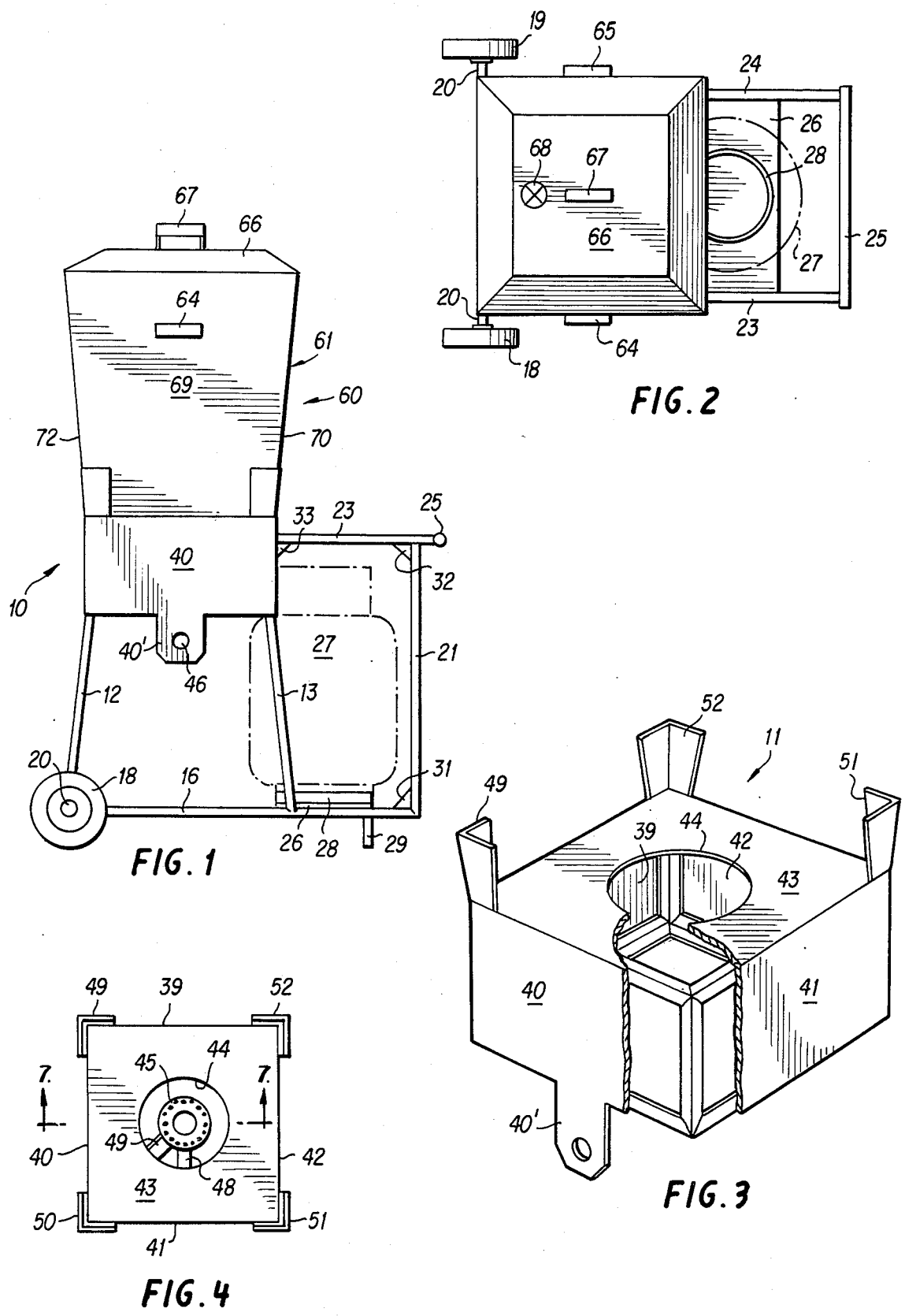

4,616,625

PORTABLE BACKYARD CRAB COOKER OR STEAMER

FIELD OF INVENTION

The present invention is in the general field of portable cooking units. More specifically the invention is in the field of cooking shellfish by steaming.

BACKGROUND OF THE INVENTION

Most shellfish are cooked by boiling them in a pot or baking them in an oven. These procedures usually take place indoors. Outdoors, shellfish are usually boiled. There are cooking units which can be purchased in which the shellfish are placed on a bed of seaweed and then covered with a layer of seaweed after which the unit is placed over a fire or on any other heating device. It is also known to build a bed of hot coals, place a layer of seaweed over the coals, put the shellfish on the seaweed, cover the shellfish with another layer of seaweed and then cover the entire area with a tarpaulin or similar material and then wait for the shellfish to be cooked by steam from the moisture in the seaweed.

Prior to the present invention there was no known portable steamer for shellfish similar to the very familiar portable grills used in cooking meats over a bed of hot charcoal briquets or by smoke heating.

SUMMARY OF THE PRESENT INVENTION

The present invention comprises an easily moved about cooking unit having a heating assembly and a removable steamer assembly which is fitted to the top of the heating assembly. The heating assembly is provided with a replaceable tank of propane or other liquid gas and suitable heat controls. The steamer assembly comprises a covered steam producing pot and a removable steaming pot to hold the shellfish out of the water while subjecting the shellfish to the steam.

BRIEF DESCRIPTION OF THE DRAWINGS

The present invention can be seen in an illustrative embodiment in the accompanying drawings.

FIG. 1 is an elevation view of the left side of the present invention, the right side being substantially identical.

FIG. 2 is a top place view of the present invention.

FIG. 3 is a perspective view in partial section of the heating base of the present invention.

FIG. 4 is a top plan view of the heating base of the present invention with the gas burner installed.

DETAILED DESCRIPTION OF THE INVENTION

Figure 5:
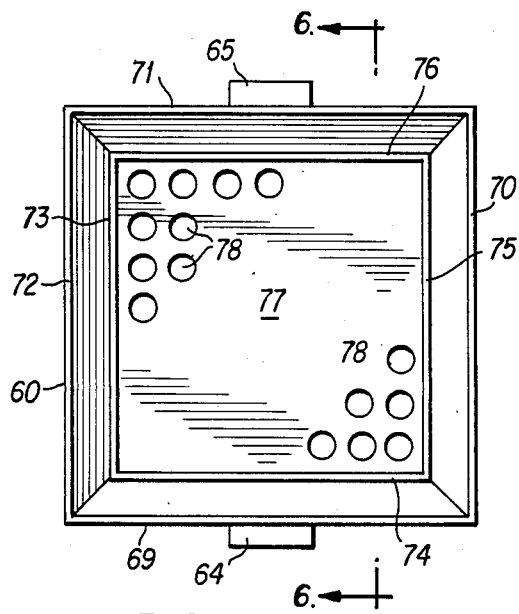
FIG. 5 is a top plan view of the steamers assembly with the cover removed.
Figure 6:
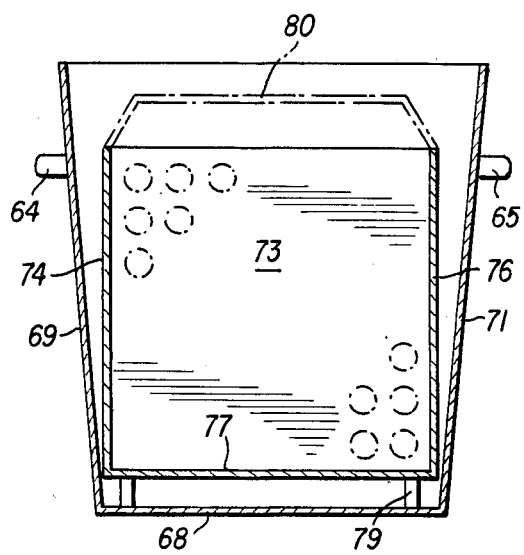
FIG. 6 is a vertical cross sectional view of the steamer assembly along the plane 6—6 in FIG. 5.
Figure 7:
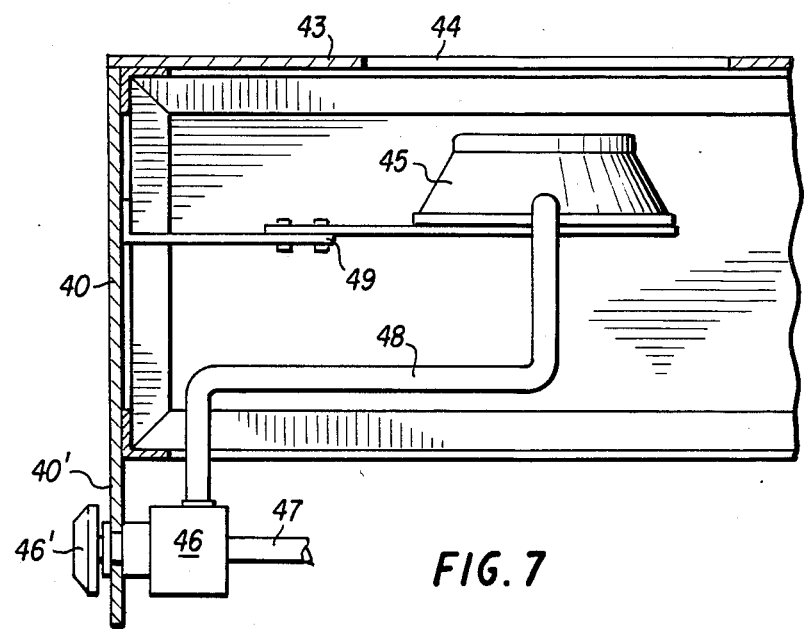
FIG. 7 is a partial cross-sectional view of the heating assembly along the plane 7—7 in FIG. 3.

Reffering to FIGS. 1 and 2, the present invention will be seen to comprising a heating assembly 10 and a steamer assembly 60. The heating assembly 10 in turn comprises a heating base 11 from which bottom depend four legs 12, 13, 14 and 15 (not shown). The legs are L-shaped. Legs 12 and 13 terminate on a horizontal bar 16 also of L-shape. Although not seen, legs 14 and 15 singularly terminate on a horizontal bar 17. A pair of wheels 18 and 19 are rotatably mounted on a shaft 20 which is fixed to the horizontal bars 16 and 17 to provide lateral rigidity to horizontal bars 16 and 17 at the rear of the heating base. At the forward ends of horizontal bars 16 and 17 there are attached vertical support bars 21 and 22 (not seen). Attached to the front face of the heating base and extending outwardly therefrom beyond the upper ends of vertical support bars 21 and 22 are handle supports 23 and 24 which are secured to the respective upper, ends of the support bars. Across the outer ends of handle support bars 23 and 24 and secured thereto is bar 25 which is the handle by which the unit is moved about. Between legs 13 and 15 a metal plate 26 is attached to the top of horizontal bars 16 and 17 to provide support for the replacable liquified gas tank 27 shown in broken lines as it is not a part of the present invention. At the top of plate 26 means 28 are provided to receive the bottom ring of gas tank 27 and prevent the tank 27 from sliding when the front of the heating assembly is lifted for movement of the heating assembly. Means 28 may be a ring as seen in FIG. 2 more clearly or a metal disk or a plurality of metal stubs projecting upwardly from plate 26. The principal requirements for means 28 is a circumference slightly less than that of the bottom ring of tank 27 and a height sufficient to retain the bottom ring of tank 27 in position on plate 26 after the assembly 10 is moved about. To hold the heating assembly level when it is in the use position, a pair of stub legs 29 and 30 (not seen) is secured to the respective horizontal support bars as shown. As with the depending legs and horizontal support base, the vertical support bars, handle support bars, cross bar and stub legs are L-shaped in cross-section. These bars and legs may be secured to one another as described above by welding or as shown in FIG. 1 by the use to triangular plates 31, 32, 33, 34 (and not seen plates 35, 36, 37, 38).

The heating base 11 is formed by a plurality of L-shaped members (unnumbered) formed into a 3-dimensional frame by welding in a conventional manner. This frame is then covered on the sides and top by metal plates 39, 40, 41, 42 and 43 which are attached to the frame by conventional welding techniques. The top plate 43 has a circular opening 44 so that the heat from burner 45 is not dispensed. Selectively side plate 40 or 42 has a depending portion 40' into which is inserted gas feed flow control valve 46. Gas flow valve 46 inserted between gas feed line 47 from tank 27 and gas burner feed line 48 is of a conventional type. Burner 45 may be supported below opening 44 by bracket means 49 which may be secured to any of the side plates 39–42 by conventionally known means, ie, welding or nuts and bolts. At each corner of top plate 43 and outwardly extending, a V-shaped bracket 49, 50, 51, 52 is attached by conventional welding techniques. Each V-shaped bracket is inclined outwardly from top plate 43 to receive the steamer assembly.

Steamer assembly 60 is comprised of an outer tub 61 a cover 66 and an interiorly positioned steaming tub 63. Outer tub 61 has a pair of wooden handles 64 and 65, a top 66 also having a wooden handle 67 and a steam venting butterfly valve 68. Outer tub 61 is an invented truncated pyramid having a solid bottom 68 and four outwardly extending sides 69, 70, 71 and 72, the sides having an inclination compatible with the angular configuration of brackets 49–52. Steaming tub 63 has a rectangular configuration with vertical sides 73, 74, 75 and 76 extending upwardly from tub bottom 77. Tub bottom 77 has a plurality of openings 78 formed therein. Tub 63 is spacely positioned above bottom 68 of outer tub 61 by a plurality of supports 79 which may be a plurality of depending legs or a segmented peripheral square or ring. Tub 63 may have a pair of wooden handles (not shown) on sides 73 and 75 or 74 and 46 or a pair of hand openings (not shown) in the upper portions of opposing sides.

While the use of the present invention may appear readily determined from the foregoing description, it is germane to the present invention to note that the outwardly extending sides 69-72 of outer tub 61 permit the rising steam to freely flow about and over the sides 73-76 of steaming tub 63 and by the presence top 66 cause the steam to flow down into steaming tub 63 in contraction with the steam flowing upwardly through openings 78. It is also within the the scope of the present invention to provide steaming tub 63 with its own cover 80 shown in dashed lines and openings in the upper portions of sides 73-76 also in dashed lines.

While the present invention has been shown and described as having rectilinear configuration, it will be recognized by those of skill in the art that other geometrical configurations will come within the scope of the invention as set forth in the following claims.

What is claimed is:

1. A portable steam heating unit for shellfish comprising: a heating assembly and a steamer assembly; said heating assembly comprising a heating base from which depends a wheeled support structure, said heating base comprising a metal frame, the vertical sides of said frame being covered by at least one metal plate, the top of said frame being covered by a metal plate having an opening therein above a liquified gas heating element assembly positioned within said frame, one of said metal plates having a depending portion which mounts a control valve for the supply of liqufed gas to said heating element, said top plate having a plurality of upwardly and outwardly extending brackets; said wheeled support structure comprising a wheel assembly at one end and a fixed depending support assembly at the opposite end, said support assembly including handle means fixed to said base; said steamer assembly comprising an outer lidded pot and an interiorly positioned pot, said inner pot having at least a perforated bottom plate with depending supports to position said inner pot above the bottom of said outer pot, said steamer assembly being fittedly positioned above said opening in said top plate of said heating base in said bracket and removable therefrom.

2. The unit according to claim 1 wherein said wheeled support assembly comprises a spacedly positioned plurality of legs depending from said frame, the legs on each relevant side of said frame terminating in, and being secured to a horizontal support bar which extends from the rear of said frame forwardly beyond the front of said frame a predetermined distance, each forwardly extending horizontal support bar having affixed thereto at its forward terminal end a vertical support bar to the upper end of which is affixed a horizontally extending handle support bar attached at its inner end to said heating base the outer ends of said handle support bars being connected by a handle bar secured to each end, said wheeled support assembly further having stub leg depending from each horizontal support bar, said wheeled support assembly additionally having a shaft attached and interconnecting the rear ends of said horizontal support bars, a wheel being journally mounted on each end of said shaft, said wheeled support assembly further having a metal plate affixed to said horizontal support bars at a position forward of said frame and means on said plate to receive and restrain against movement the bottom ring of a liquified gas container.

3. The unit according to claim 1 wherein said steamer assembly comprises an inverted, truncated three dimensional geometrical outer pot having at least one pair of opposedly positioned heat resistant handles, and a top with heat resistant handles, said inner pot having vertical sides which are spaced from the interior wall of said outer pot.

4. The unit according to claim 1 wherein said brackets are V-shaped said outer pot being an inverted pyramid, said outer and inner pot being an upright rectilinear box.

5. The unit according to claim 4, wherein said brackets are arcuate, said outer pot being an inserted truncated cone and said inner pot is an upright cylinder.

* * * * *